(12) United States Patent
Manabe et al.

(10) Patent No.: US 8,846,258 B2
(45) Date of Patent: Sep. 30, 2014

(54) FUEL CELL SYSTEM

(75) Inventors: Kota Manabe, Toyota (JP); Hiroyuki Imanishi, Toyota (JP); Tomoya Ogawa, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1365 days.

(21) Appl. No.: 12/279,917

(22) PCT Filed: Oct. 22, 2007

(86) PCT No.: PCT/JP2007/070972
§ 371 (c)(1),
(2), (4) Date: Aug. 19, 2008

(87) PCT Pub. No.: WO2008/050881
PCT Pub. Date: May 2, 2008

(65) Prior Publication Data
US 2010/0227240 A1 Sep. 9, 2010

(30) Foreign Application Priority Data
Oct. 27, 2006 (JP) ................. 2006-292418

(51) Int. Cl.
*H01M 8/04* (2006.01)
*B60L 11/18* (2006.01)

(52) U.S. Cl.
CPC ....... *B60L 11/1894* (2013.01); *H01M 8/04619* (2013.01); *B60L 11/1885* (2013.01); *H01M 8/0494* (2013.01); *Y02T 90/34* (2013.01); *H01M 8/04223* (2013.01); *H01M 8/04753* (2013.01); *Y02E 60/50* (2013.01); *B60L 11/1892* (2013.01)

USPC .......................................... 429/429; 429/433

(58) Field of Classification Search
USPC ......................................... 429/428–433, 442
See application file for complete search history.

(56) References Cited

U.S. PATENT DOCUMENTS

| 6,158,537 | A * | 12/2000 | Nonobe ......................... 429/431 |
| 6,379,827 | B1 * | 4/2002 | Cipollini ....................... 429/429 |
| 6,444,338 | B1 * | 9/2002 | Araki et al. .................... 429/435 |
| 2003/0031905 | A1 * | 2/2003 | Saito et al. ..................... 429/26 |
| 2004/0076860 | A1 * | 4/2004 | Aso ................................ 429/23 |
| 2004/0106026 | A1 * | 6/2004 | Fujita et al. ..................... 429/24 |

FOREIGN PATENT DOCUMENTS

| JP | 2002-313388 A | 10/2002 |
| JP | 2003-317765 A | 11/2003 |
| JP | 2004-030979 A | 1/2004 |

(Continued)

*Primary Examiner* — Jonathan Crepeau
*Assistant Examiner* — Jacob Buchanan
(74) *Attorney, Agent, or Firm* — Kenyon & Kenyon LLP

(57) ABSTRACT

The theme of the present invention is a fuel cell system capable of avoiding a disadvantage caused by the maintaining of a low-efficiency operation to improve the safety of a system operation. The fuel cell system is configured to perform the low-efficiency operation having a large power loss as compared with a usual operation at a predetermined low temperature to raise the temperature of a fuel cell in a short time as compared with the usual operation. The fuel cell system prohibits the low-efficiency operation to execute the usual operation, in a case where predetermined conditions are established at the predetermined low temperature. The predetermined conditions include a time when the generated power of the fuel cell cannot be consumed, a time when this generated power cannot be accumulated in a battery, or a time when the flooding of the fuel cell is generated.

4 Claims, 4 Drawing Sheets

(56) References Cited

FOREIGN PATENT DOCUMENTS

| JP | 2004-172027 A | 6/2004 | | |
| JP | 2006-073501 A | 3/2006 | | |
| JP | 2006-100093 A | 4/2006 | | |
| JP | 2006-286513 A | 10/2006 | | |
| WO | WO 01/03215 A1 | 1/2001 | | |
| WO | WO 2005050767 A2 * | 6/2005 | .............. | H01M 8/04 |
| WO | WO 2007/046545 A1 | 4/2007 | | |

* cited by examiner $(2H^+ + 2e^- + 1/2O_2 \rightarrow H_2O)$  $(H_2 \rightarrow 2H^+ + 2e^-)$ $(2H^+ + 2e^- \rightarrow H_2)$  $(H_2 \rightarrow 2H^+ + 2e^-)$

FUEL CELL SYSTEM

This is a 371 national phase application of PCT/JP2007/070972 filed 22 Oct. 2007, which claims priority to Japanese Patent Application No. 2006-292418 filed 27 Oct. 2006, the contents of which are incorporated herein by reference.

TECHNICAL FIELD

The present invention relates to a fuel cell system capable of quickly raising the temperature of a fuel cell by a low-efficiency operation.

BACKGROUND ART

A solid polymer type fuel cell to be mounted on a fuel cell vehicle or the like generates a power by a chemical reaction between hydrogen in a fuel gas supplied to an anode and oxygen in an oxidizing gas supplied to a cathode. In this type of fuel cell, a temperature range optimum for the power generation is usually 70 to 80° C. A long time is sometimes required from a time when the fuel cell is started to a time when this temperature range is reached, depending on a use environment.

In view of such a situation, in a fuel cell system disclosed in Japanese Patent Application Laid-Open No. 2002-313388, a low-efficiency operation is performed to quickly raise the temperature of the fuel cell. Here, the low-efficiency operation is an operation having a large power loss as compared with a usual operation, in other words, an operation of lowering the power generation efficiency of the fuel cell as compared with the usual operation to increase thermal energy as compared with the usual operation. Then, in this fuel cell system, when a cooling solution temperature is 0° C. or less, the low-efficiency operation is constantly performed to reduce the warm-up time of the fuel cell.

DISCLOSURE OF THE INVENTION

However, when the fuel cell system constantly performs the low-efficiency operation, a disadvantage might be generated during the maintaining of the low-efficiency operation, and further improvement is demanded.

An object of the present invention is to provide a fuel cell system that can avoid such a disadvantage to improve the stability of a system operation.

To achieve the above object, the fuel cell system of the present invention is configured to perform a low-efficiency operation having a large power loss as compared with a usual operation at a predetermined low temperature to raise the temperature of a fuel cell in a short time as compared with the usual operation. The fuel cell system includes a controller, and the controller prohibits the low-efficiency operation to execute the usual operation, in a case where predetermined conditions are established at the predetermined low temperature.

When a disadvantage generated during the maintaining of the low-efficiency operation is assumed, that is, when the predetermined conditions are established, the low-efficiency operation can be switched to the usual operation. In consequence, the disadvantage generated during the maintaining of the low-efficiency operation can be avoided, and the safety of the system operation can be improved.

According to one preferable mode of the present invention, the predetermined conditions include a time when the generated power of the fuel cell by the low-efficiency operation cannot be consumed.

In such a case, the low-efficiency operation cannot be maintained. The low-efficiency operation is switched to the usual operation to reduce the amount of the power to be generated by the fuel cell, whereby the system operation can stably be performed.

According to another preferable mode of the present invention, the fuel cell system may further include a power accumulation device configured to accumulate the generated power of the fuel cell. Then, the predetermined conditions preferably include at least one of a time when the generated power of the fuel cell by the low-efficiency operation cannot be accumulated in the power accumulation device and a time when the amount of the power accumulated in the power accumulation device is larger than a predetermined amount.

This is because that even in such a case, when the low-efficiency operation is maintained, there is not any place to which the power generated by the fuel cell is directed.

According to one preferable mode of the present invention, the predetermined conditions may include a time when flooding is generated in the fuel cell.

For example, when the amount of a reactive gas to be supplied to the fuel cell is reduced to perform the low-efficiency operation, the discharge of water generated by the power generating reaction of the fuel cell is not promoted. Therefore, the flooding might be generated in the fuel cell to lower a voltage. According to the above constitution of the present invention, when the flooding is generated, the low-efficiency operation is switched to the usual operation, so that the discharge of the generated water can be promoted, and the drop of the voltage can be suppressed.

Preferably, the controller may prohibit the low-efficiency operation to stop the power generation of the fuel cell, in a case where a request for stopping the power generation of the fuel cell is accepted.

In consequence, in a case where there is, for example, a request for the intermittent operation of the fuel cell, or a request for stopping the power generation due to IG-OFF or system abnormality, the power generation of the fuel cell can be stopped.

Preferably, the controller may control so as to execute the low-efficiency operation during the startup of the fuel cell.

By the way, when the low-efficiency operation is performed, the hydrogen gas is discharged from the anode side in the fuel cell, and hydrogen (mainly pumping hydrogen) is sometimes discharged from a cathode side. To discharge an oxidizing off gas including hydrogen as it is to the atmosphere is not preferable from an environmental viewpoint.

Thus, according to one preferable mode of the present invention, the fuel cell system further comprises: a supply path through which an oxidizing gas to be supplied to the fuel cell flows; a discharge path through which an oxidizing off gas discharged from the fuel cell flows; a bypass path which connects the supply path to the discharge path so that the oxidizing gas bypasses the fuel cell; and a bypass valve which opens and closes the bypass path. Preferably, the controller opens the bypass valve during the low-efficiency operation, and closes the bypass valve during the usual operation.

In consequence, during the low-efficiency operation, hydrogen which might be contained in the oxidizing off gas can be diluted by the bypassed oxidizing gas. Therefore, the oxidizing off gas can appropriately be discharged from the discharge path to the atmosphere. On the other hand, during the usual operation, the oxidizing gas does not have to bypass the fuel cell, so that the oxidizing gas can appropriately be supplied to the fuel cell.

BRIEF DESCRIPTION OF THE DRAWINGS

FIG. 3A shows a cell reaction during a usual operation, and FIG. 3B shows a cell reaction during a low-efficiency operation.

BEST MODE FOR CARRYING OUT THE INVENTION

A fuel cell system according to the preferable embodiment of the present invention will hereinafter be described with reference to the accompanying drawings. First, the outline of the fuel cell system according to the present invention will be described, and then conditions in a case where a low-efficiency operation is prohibited and switched to a usual operation will be described.

Figure 1:
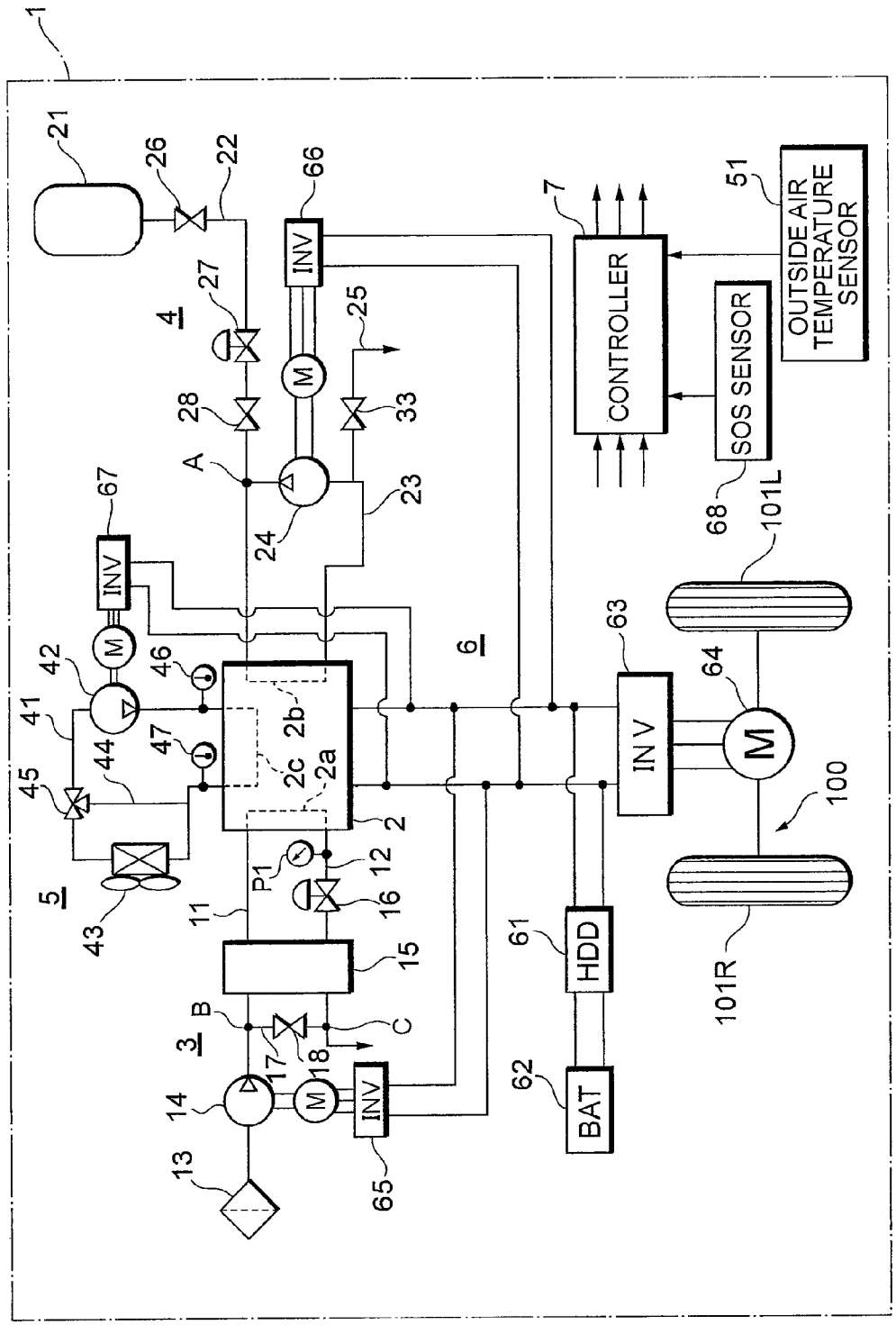
FIG. 1 is a block diagram of a fuel cell system according to an embodiment.

As shown in FIG. 1, a fuel cell system 1 can be mounted on a vehicle such as a fuel cell hybrid vehicle (FCHV), an electric vehicle or a hybrid vehicle. However, the fuel cell system 1 may be applied to not only the vehicle but also any type of mobile body (e.g., a ship, an airplane, a robot or the like) or a stationary power source.

The fuel cell system 1 includes a fuel cell 2; an oxidizing gas piping system 3 which supplies air as an oxidizing gas to the fuel cell 2; a fuel gas piping system 4 which supplies a hydrogen gas as a fuel gas to the fuel cell 2; a refrigerant piping system 5 which supplies a refrigerant to the fuel cell 2 to cool the fuel cell 2; a power system 6 which charges and discharges the power of the system 1; and a controller 7 which controls the system as a whole.

The fuel cell 2 is constituted of, for example, a solid polymer electrolytic type, and has a stack structure in which a large number of unit cells are laminated. The unit cell has an air electrode (a cathode) on one surface of an electrolyte constituted of an ion exchange film and a fuel electrode (an anode) on the other surface, and further has a pair of separators so as to sandwich the air electrode and the fuel electrode therebetween. The oxidizing gas is supplied to an oxidizing gas channel 2a of one separator, and the fuel gas is supplied to a fuel gas channel 2b of the other separator. The fuel cell 2 generates a power by an electrochemical reaction between the supplied fuel gas and the supplied oxidizing gas. The electrochemical reaction in the fuel cell 2 is a heat generating reaction, and the temperature of the solid polymer electrolytic type of fuel cell 2 is about 60 to 80° C.

The oxidizing gas piping system 3 includes a supply path 11 through which the oxidizing gas to be supplied to the fuel cell 2 flows, a discharge path 12 through which an oxidizing off gas discharged from the fuel cell 2 flows, and a bypass path 17 through which the oxidizing gas bypasses the fuel cell 2 to flow. The supply path 11 communicates with the discharge path 12 via the oxidizing gas channel 2a. The oxidizing off gas can contain pumping hydrogen generated on the side of the air electrode of the fuel cell 2 (details will be described later). Moreover, the oxidizing off gas contains the water content generated by the cell reaction of the fuel cell 2, and hence has a highly wetted state.

The supply path 11 is provided with a compressor 14 (a supply machine) which takes outside air via an air cleaner 13, and a humidifier 15 which humidifies the oxidizing gas fed under pressure to the fuel cell 2 by the compressor 14. The humidifier 15 performs water content exchange between the oxidizing gas flowing through the supply path 11 and having a lowly wetted state and the oxidizing off gas flowing through the discharge path 12 and having the highly wetted state. In consequence, the oxidizing gas to be supplied to the fuel cell 2 is appropriately humidified.

The back pressure of the oxidizing gas to be supplied to the fuel cell 2 is adjusted by a back pressure regulating valve 16 provided in the discharge path 12 around a cathode outlet. A pressure sensor P1 which detects a pressure in the discharge path 12 is provided near the back pressure regulating valve 16. The oxidizing off gas is finally discharged as an exhaust gas from the system to the atmosphere through the back pressure regulating valve 16 and the humidifier 15.

The bypass path 17 connects the supply path 11 to the discharge path 12. A supply-side connecting portion B between the bypass path 17 and the supply path 11 is positioned between the compressor 14 and the humidifier 15. Moreover, a discharge-side connecting portion C between the bypass path 17 and the discharge path 12 is positioned on the downstream side of the humidifier 15. The bypass path 17 is provided with a bypass valve 18 which is an opening/closing valve (a shutoff valve) to be driven by a motor, a solenoid or the like. The bypass valve 18 is connected to the controller 7 to open and close the bypass path 17. In the following description, the oxidizing gas to be bypassed to the downstream side of the bypass path 17 through the bypass valve 18 by opening the bypass valve 18 will generically be referred to as "bypass air".

The fuel gas piping system 4 has a hydrogen supply source 21; a supply path 22 through which the hydrogen gas to be supplied from the hydrogen supply source 21 to the fuel cell 2 flows; a circulation path 23 for returning, to a joining part A of the supply path 22, a hydrogen off gas (the fuel off gas) discharged from the fuel cell 2; a pump 24 which feeds the hydrogen off gas under pressure in the circulation path 23 to the supply path 22; and a purge path 25 branched and connected to the circulation path 23. A source valve 26 is opened, whereby the hydrogen gas discharged from the hydrogen supply source 21 to the supply path 22 is supplied to the fuel cell 2 through a pressure regulating valve 27, another pressure reduction valve and a shutoff valve 28. The purge path 25 is provided with a purge valve 33 for discharging the hydrogen off gas to a hydrogen diluter (not shown).

The refrigerant piping system 5 has a refrigerant channel 41 which communicates with a cooling channel 2c in the fuel cell 2; a cooling pump 42 provided in the refrigerant channel 41; a radiator 43 which cools the refrigerant discharged from the fuel cell 2; a bypass channel 44 which bypasses the radiator 43; and a switch valve 45 which sets the circulation of cooling water through the radiator 43 and the bypass channel 44. The refrigerant channel 41 has a temperature sensor 46 provided near the refrigerant inlet of the fuel cell 2, and a temperature sensor 47 provided near the refrigerant outlet of the fuel cell 2. The refrigerant temperature detected by the temperature sensor 47 reflects the inner temperature (hereinafter referred to as the "temperature of the fuel cell 2") of the fuel cell 2. The cooling pump 42 is driven by a motor to circulate the refrigerant in the refrigerant channel 41 to the fuel cell 2.

The power system 6 includes a high-voltage DC/DC converter 61, a battery 62, a traction inverter 63, a traction motor 64, and various auxiliary inverters 65, 66 and 67. The high-voltage DC/DC converter 61 is a direct-current voltage converter. The high-voltage DC/DC converter 61 has a function of adjusting a direct-current voltage input from the battery 62 to output the voltage to a traction inverter 63 side and a function of adjusting the direct-current voltage input from the fuel cell 2 or the traction motor 64 to output the voltage to the battery 62. The charging/discharging of the battery 62 is realized by these functions of the high-voltage DC/DC converter 61. Moreover, the output voltage of the fuel cell 2 is controlled by the high-voltage DC/DC converter 61. The amount of the power accumulated in the battery 62 is detected by an SOC sensor 68.

The traction inverter 63 converts a direct current into a three-phase alternate current to supply the current to the traction motor 64. The traction motor 64 (a power generation device) is, for example, a three-phase alternate-current motor. The traction motor 64 constitutes, for example, the main power source of a vehicle 100 on which the fuel cell system 1 is to be mounted, and is connected to wheels 101L, 101R of the vehicle 100. The auxiliary inverters 65, 66 and 67 control the driving of the motors of the compressor 14, the pump 24 and the cooling pump 42, respectively.

The control section 7 is constituted as a microcomputer including therein a CPU, an ROM and an RAM. The CPU executes desired calculation in accordance with a control program to perform various processing and control such as the control of a usual operation and the control of a low-efficiency operation described later. The ROM stores the control program or control data to be processed by the CPU. The RAM is used as any type of working area mainly for control processing.

The controller 7 inputs detecting signals from various sensors such as any type of pressure sensor (P1), temperature sensors (46, 47), an outside air temperature sensor 51 which detects the outside air temperature of the environment where the fuel cell system 1 is disposed, the SOC sensor 68, and any type of sensor such as an accelerator open degree sensor which detects the accelerator open degree of the vehicle 100. The controller 7 outputs control signals to constituting elements (the supply machine 14, the back pressure regulating valve 16, the bypass valve 18 and the like) based on the input. The controller 7 performs an operation with a low power generation efficiency by use of various maps stored in the ROM, in a case where the fuel cell 2 needs to be warmed up during starting at a low temperature or the like. Furthermore, the controller 7 prohibits the low-efficiency operation on predetermined conditions.

Figure 2:
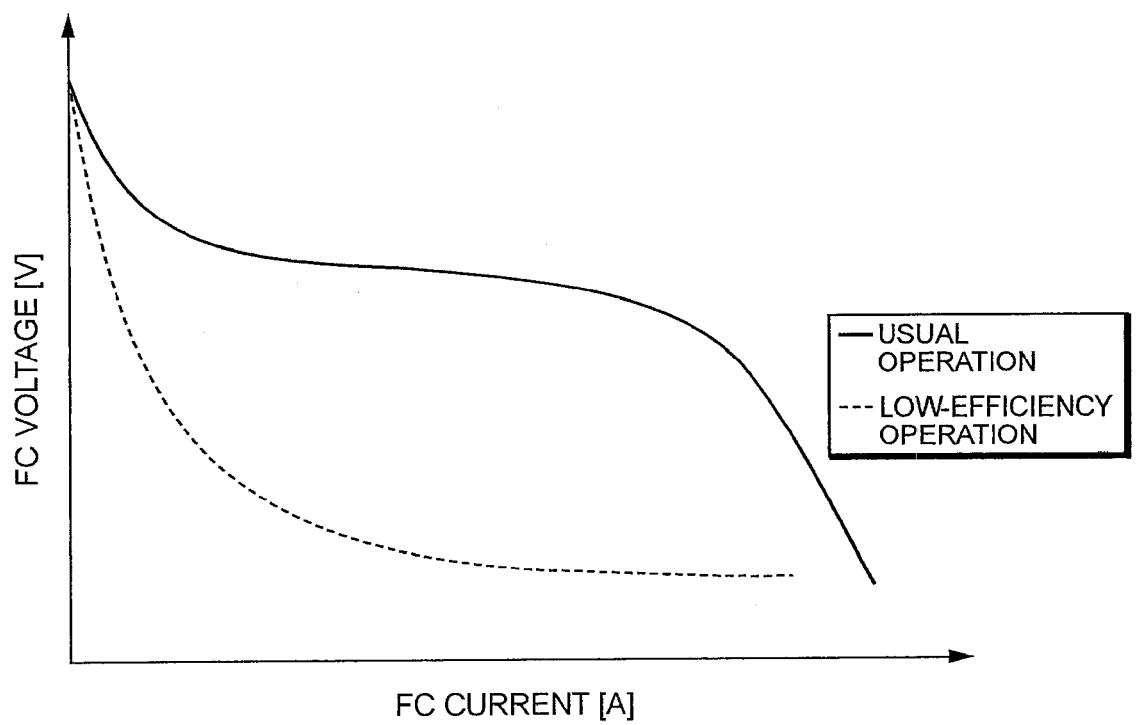
FIG. 2 is a graph showing a relation between an FC current and an FC voltage according to the embodiment.

FIG. 2 is a diagram showing a relation between the output current (hereinafter referred to as the "FC current") of the fuel cell 2 and an output voltage (hereinafter referred to as the "FC voltage"). In FIG. 2, a solid line shows a case where the fuel cell system 1 performs an operation (hereinafter referred to as the "usual operation") with a comparatively high power generation efficiency, and a dotted line shows a case where the fuel cell system 1 performs an operation (hereinafter referred to as the "low-efficiency operation") with a comparatively low power generation efficiency. It is to be noted that at least the oxidizing gas piping system 3 and the fuel gas piping system 4 are controlled by the controller 7 to perform the usual operation and the low-efficiency operation.

To perform the usual operation of the fuel cell system 1, the fuel cell 2 is operated in a state in which an air stoichiometric ratio is set to 1.0 or more (a theoretical value) so that a power loss is suppressed to obtain the high power generation efficiency (see the solid line part of FIG. 2). Here, the air stoichiometric ratio is an oxygen surplus ratio indicating the surplus degree of oxygen to be supplied with respect to oxygen required for reaction with hydrogen without any excess or deficiency.

On the other hand, to warm up the fuel cell 2, the fuel cell 2 is operated in a state in which the air stoichiometric ratio is less than 1.0 (the theoretical value) so that the power loss is increased to raise the temperature of the fuel cell 2 (see the dotted line part of FIG. 2). When the air stoichiometric ratio is set to a low ratio to perform the low-efficiency operation, a power loss content (i.e., a heat loss content) is positively increased in energy which can be derived by the reaction between hydrogen and oxygen. Therefore, when the low-efficiency operation is performed, the temperature of the fuel cell 2 can be raised in a short time as compared with the usual operation, and the warm-up time of the cell can be reduced. On the other hand, however, when the low-efficiency operation is performed, pumping hydrogen is generated in the air electrode of the fuel cell 2.

Figure 3A:
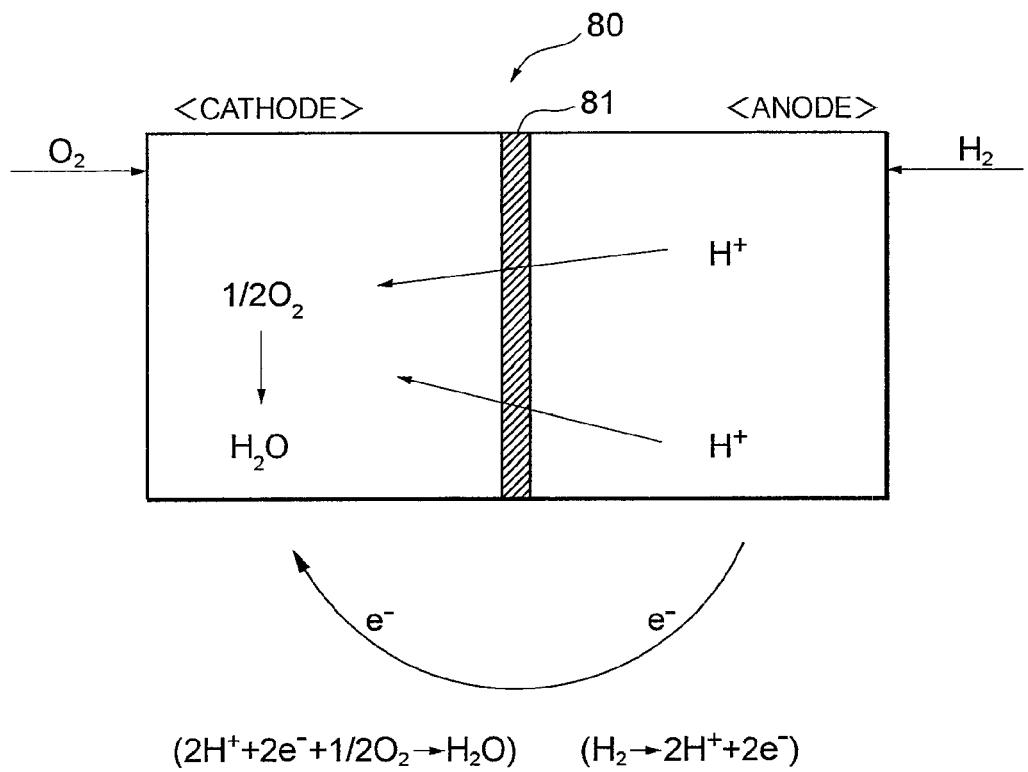
FIGS. 3A and 3B are diagrams showing the generation mechanism of pumping hydrogen according to the embodiment.
Figure 3B:
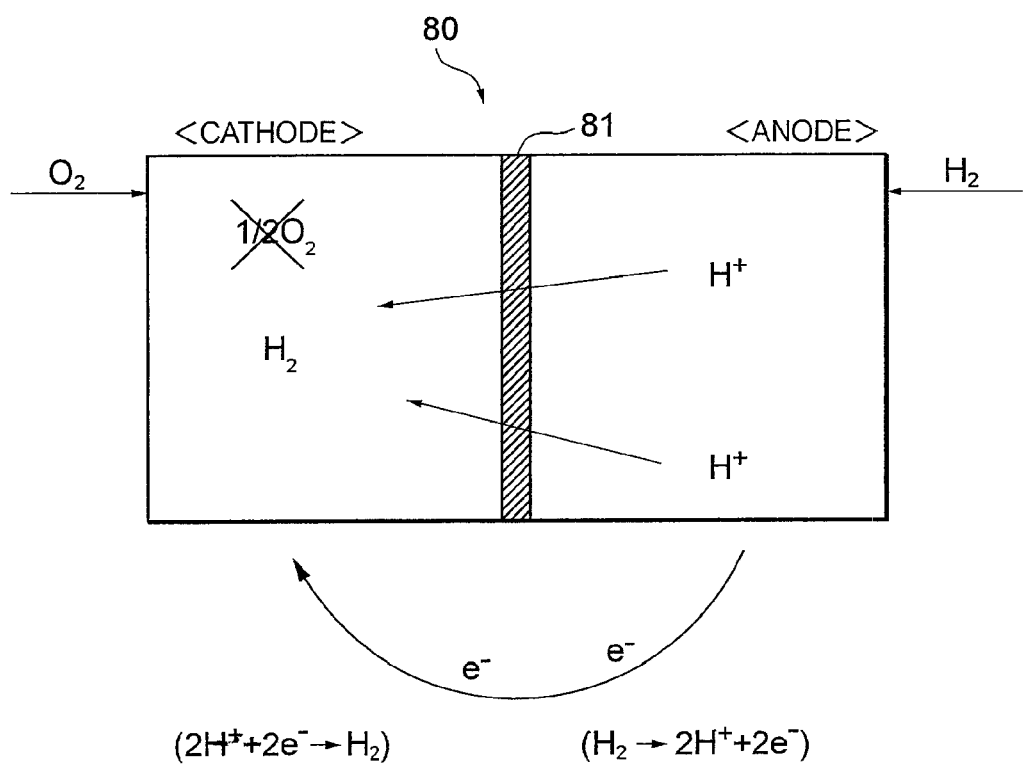

FIGS. 3A and 3B are diagrams showing the generation mechanism of pumping hydrogen. FIG. 3A shows a cell reaction during the usual operation and FIG. 3B shows a cell reaction during the low-efficiency operation.

Each unit cell 80 of the fuel cell 2 includes an electrolytic film 81, and an anode and a cathode which sandwich this electrolytic film 81 therebetween. Fuel gas containing hydrogen ($H_2$) is supplied to the anode, and Oxidizing gas containing oxygen ($O_2$) is supplied to the cathode. When the fuel gas is supplied to the anode, the reaction of the following formula (1) proceeds, and hydrogen is electronically separated from hydrogen ions. The hydrogen ions formed in the anode passes through the electrolytic film 81 to move to the cathode, whereas electrons pass through an external circuit from the anode to move to the cathode.

$$\text{Anode: } H_2 \rightarrow 2H^+ + 2e^- \tag{1}$$

During the usual operation shown in FIG. 3A, that is, when the oxidizing gas is sufficiently supplied to the cathode (the air stoichiometric ratio ≥ 1.0), the reaction of the following formula (2) proceeds to generate water from oxygen, the hydrogen ions and the electrons.

$$\text{Cathode: } 2H^+ + 2e^- + (1/2)O_2 \rightarrow H_2O \tag{2}$$

During the low-efficiency operation shown in FIG. 3B, that is, when the oxidizing gas is insufficiently supplied to the cathode (the air stoichiometric ratio < 1.0), the reaction of the following formula (3) proceeds in accordance with the amount of the shortage of the oxidizing gas, and the hydrogen ions are again bonded to the electrons to form hydrogen. The formed hydrogen is discharged from the cathode together with the oxidizing off gas. It is to be noted that hydrogen formed in the cathode by re-bonding the separated hydrogen ions and electrons, that is, an anode gas formed in the cathode will be referred to as pumping hydrogen.

$$\text{Cathode: } 2H_+ + 2e^- \rightarrow H_2 \tag{3}$$

As above, in a state in which the supply of the oxidizing gas to the cathode comes short, the oxidizing off gas includes the pumping hydrogen.

Accordingly, when the fuel cell system 1 performs the low-efficiency operation, the controller 7 controls the bypass valve 18 to open so that a part of the oxidizing gas to be supplied by the compressor 13 is branched to the bypass path 17. This branched bypass air dilutes the concentration of hydrogen in the oxidizing off gas, whereby the oxidizing off gas having the hydrogen concentration reduced to a safe range is discharged from the system via the discharge path 12.

Here, the low-efficiency operation is mainly performed during the startup of the fuel cell system 1 for a purpose of warming up the fuel cell 2, and performed especially only during the startup at the low temperature. For example, when the outside air temperature detected by the outside air temperature sensor 51 during the startup of the fuel cell system 1 is a predetermined low temperature (e.g., 0° C. or less), the low-efficiency operation of the fuel cell system 1 is performed. Afterward, when the warm-up of the fuel cell 2 is completed, the fuel cell system 1 shifts from the low-efficiency operation to the usual operation. The bypass valve 18 opens during the startup of the fuel cell system 1 which performs the low-efficiency operation, and closes during the usual operation after the low-efficiency operation.

Figure 4:
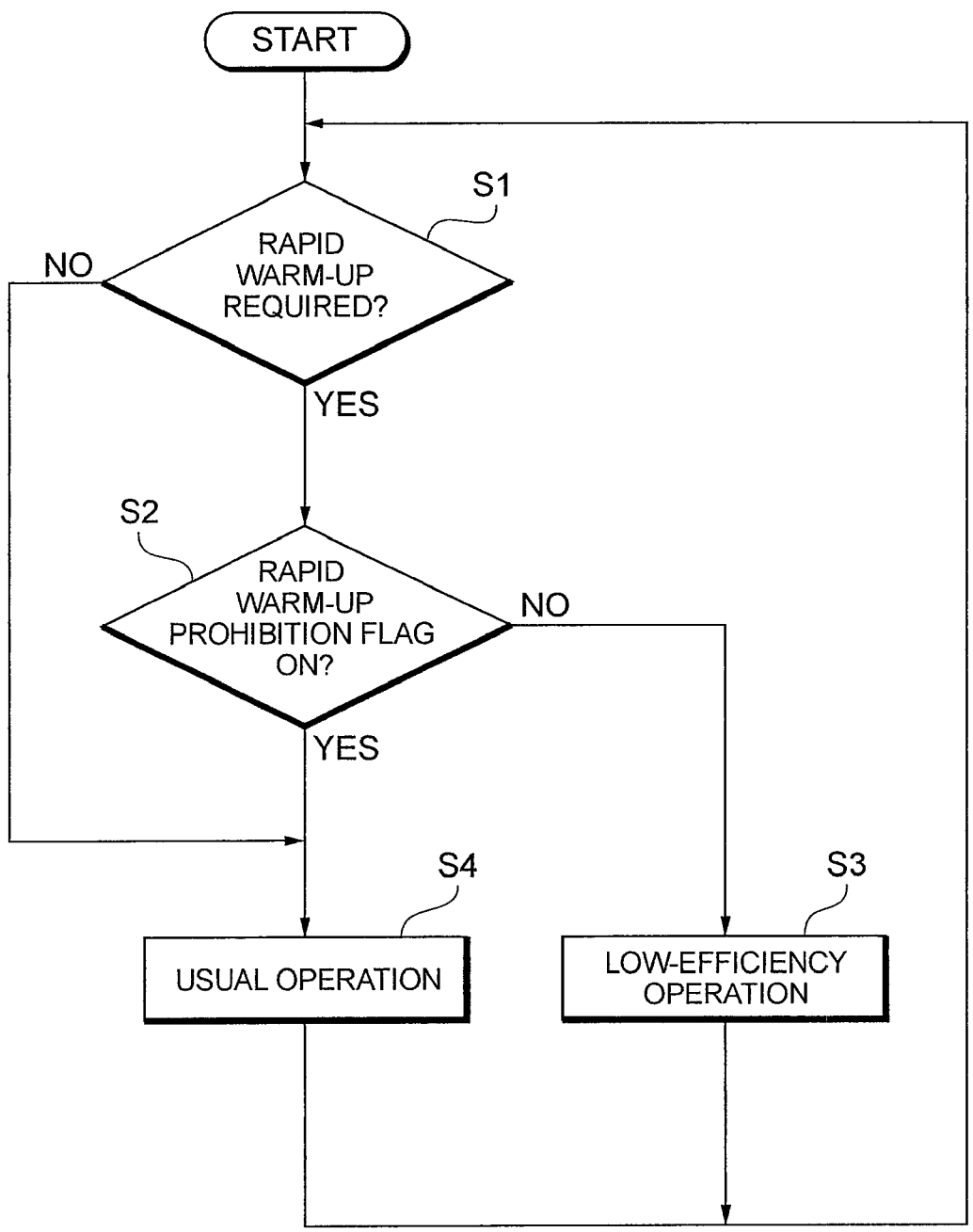
FIG. 4 is a flow chart showing a processing flow during the startup of the fuel cell system according to the present invention.

As shown in FIG. 4, in a case where the operation start of the fuel cell system 1 is instructed by, for example, the ON-operation of an ignition switch by the driver of the vehicle 100 or the like, the controller 7 judges whether or not the rapid warm-up of the fuel cell 2 is required (step S1).

Here, it is judged based on the temperature detected by the outside air temperature sensor 51 whether or not the rapid warm-up is required. In a case where this detected temperature exceeds a predetermined low temperature (e.g., 0° C. or less), it is judged that the rapid warm-up is not required (step S1; No), and a mode shifts to the mode of the usual operation (step S4). On the other hand, in a case where the detected temperature is the predetermined low temperature (e.g., 0° C. or less) or less, it is judged that the rapid warm-up is required (step S1; Yes), and the step shifts to the next step S2.

It is judged in the step S2 whether or not the prohibition flag of the rapid warm-up is ON. A case where the prohibition flag of the rapid warm-up is OFF is a case where it is supposed that any disadvantage is not generated in the subsequent low-efficiency operation even if the rapid warm-up is not prohibited. In this case (S2; No), the low-efficiency operation is started based on the request for the rapid warm-up (S3). In consequence, during the startup of the fuel cell 2, the temperature of the fuel cell 2 is quickly raised. On the other hand, when the prohibition flag of the rapid warm-up is ON (step S2; Yes), the low-efficiency operation is prohibited to execute the usual operation (S4).

Here, the predetermined conditions on which the prohibition flag of the rapid warm-up is ON include a case where there is a high possibility that a disadvantage in the system operation is generated when the low-efficiency operation is executed. Such predetermined conditions include the following conditions (1) to (5):

(1) a time when the generated power of the fuel cell 2 by the low-efficiency operation cannot be consumed;

(2) a time when the generated power of the fuel cell 2 by the low-efficiency operation cannot be accumulated in the battery 62;

(3) a time when the amount of the power accumulated in the battery 62 is larger than a predetermined amount;

(4) a time when flooding is generated in the fuel cell 2; and (5) a time when there is a request for the power generation stop of the fuel cell 2.

When at least one of these conditions (1) to (5) is established, the low-efficiency operation is prohibited. The conditions will hereinafter be described.

First, when the condition (1) is established, the low-efficiency operation is prohibited because there is not any place to which the generated power of the fuel cell 2 by the low-efficiency operation is directed. In more detail, the power generation of the fuel cell 2 needs to be continued to maintain the low-efficiency operation. However, when this generated power cannot completely be consumed by the auxiliary devices and the traction motor 64 of the fuel cell system 1, a part of the generated power cannot be directed to any place. As a result, the low-efficiency operation cannot be maintained. Therefore, when the condition (1) is established, the low-efficiency operation may be prohibited to execute the usual operation, whereby the amount of the power to be generated by the fuel cell 2 is reduced.

The conditions (2) and (3) may be said to be the specific examples of the condition (1).

For example, the battery 62 sometimes cannot be charged with the generated power of the fuel cell 2 by the low-efficiency operation owing to the abnormality or failure of the battery 62. Moreover, when the amount of the power accumulated in the battery 62 exceeds the predetermined amount, the battery 62 cannot be charged with the power generated by the fuel cell 2. Alternatively, even if the battery 62 can be charged, the battery 62 is only charged with a small amount of power. When the low-efficiency operation is continued, the battery 62 is brought into a fully charged state, and the battery 62 might not be charged any more. When the chargeable power of the battery 62 lowers in this manner, the power generation of the fuel cell 2 by the low-efficiency operation cannot be maintained. Therefore, even when the conditions (2) and (3) are established, the low-efficiency operation may be prohibited to execute the usual operation, whereby the amount of the power to be generated by the fuel cell 2 is reduced.

Next, the condition (4) will be described.

Water is generated on the cathode side of the fuel cell 2 by the power generating reaction in the fuel cell 2. This water is usually blown and flied by the flow of the oxidizing gas, and discharged from the fuel cell 2. However, during the low-efficiency operation, the power generating reaction in the fuel cell 2 proceeds in a state in which the amount of the oxidizing gas to be supplied is limited. Therefore, the discharge of the generated water is not promoted in this situation. As a result, the flooding (excessive wetting) which causes the drop of a cell voltage might be generated especially on the cathode side. To solve the problem, when the flooding is generated, that is, the condition (4) is established, the low-efficiency operation is prohibited to execute the usual operation. In consequence, the flooding can be eliminated, and the drop of the cell voltage can be suppressed.

Here, it can be judged by any type of method whether or not the flooding has been generated. It can be judged by, for example, the continuation time of the low-efficiency operation, the temperature of the fuel cell 2 and the value of the current during the power generation of the fuel cell 2. Alternatively, the water content in the fuel cell 2 is measured by, for example, an alternate-current impedance process, and it can be judged that the flooding is generated if the water content exceeds a threshold value. Moreover, the amount of the water remaining in the fuel cell 2 from the previous stop of the system operation is estimated, or the cell voltage of the fuel cell 2 is measured, whereby it can be judged whether or not the flooding has been generated.

Next, the condition (5) will be described.

For example, when the operation stop of the fuel cell system 1 is instructed by the OFF-operation (hereinafter referred to as "IG-OFF") of the ignition switch performed by the driver, the power generation stop of the fuel cell 2 is requested. Moreover, even during the abnormality of the fuel cell system 1 (the generation of diagnosis or the like), the power generation stop of the fuel cell 2 is requested. Furthermore, even when there is a request for an intermittent operation owing to hydrogen leakage detection, the power generation stop of the fuel cell 2 is requested.

It is to be noted that hydrogen leakage is detected by a hydrogen sensor (not shown) which detects the leakage of hydrogen from the system 1. Moreover, the intermittent operation is an operation mode in which the power generation of the fuel cell 2 is temporarily discontinued during an operation with a small load, for example, during idling, during run at a low speed, during regenerative braking or the like, whereas the battery 62 supplies the power to the traction motor 64, and the hydrogen gas and the oxidizing gas are intermittently supplied to the fuel cell 2 to such an extent that an open end voltage can be maintained.

The above-mentioned IG-OFF, the abnormality of the fuel cell system 1 and the request for the intermittent operation are performed not only during the starting of the fuel cell system 1 but also during the low-efficiency operation after the starting. When the request for the power generation stop of the fuel cell 2 due to the IG-OFF or the abnormality of the fuel cell system 1 is accepted, the low-efficiency operation is prohibited, and the operation of the fuel cell system 1 is stopped to stop the power generation of the fuel cell 2. On the other hand, when the request for the power generation stop of the fuel cell 2 due to the request for the intermittent operation is accepted, the low-efficiency operation is prohibited to perform the usual operation, and the intermittent operation is executed.

As described above, according to the fuel cell system 1 of the present embodiment, when at least one of the above predetermined conditions (1) to (5) is established, the low-efficiency operation is prohibited. Therefore, when the disadvantage caused by the maintaining of the low-efficiency operation is assumed, the disadvantage caused by the maintaining of the low-efficiency operation can be avoided. Moreover, when at least one of the predetermined conditions (1) to (4) is established, or when there is the request for the intermittent operation (reference: the condition (5)), the low-efficiency operation can be switched to the usual operation, and the safety of the system operation can be improved.

The invention claimed is:

1. A fuel cell system which is configured to perform a higher-efficiency operation and a lower-efficiency operation having a larger power loss than the higher-efficiency operation, the fuel cell system comprising:
   an oxidizing gas piping system which supplies an oxidizing gas to the fuel cell;
   a fuel gas piping system which supplies a fuel gas to the fuel cell; and
   a controller programmed to control at least the oxidizing gas piping system and the fuel gas piping system to control the fuel cell system to perform the lower-efficiency operation at a predetermined low temperature to raise the temperature of a fuel cell in a shorter time than the higher-efficiency operation,
   wherein the controller is programmed to use prohibition indication means which indicates if at least one of the predetermined conditions is established for the fuel cell system, and prohibit the start of the lower-efficiency operation so as to execute the higher-efficiency operation when the prohibition indication means indicates that at least one of the predetermined conditions is established at the predetermined low temperature,
   wherein the predetermined conditions include at least one of a time when a generated power of the fuel cell by the lower-efficiency operation cannot be consumed, a time when the generated power of the fuel cell by the lower-efficiency operation cannot be accumulated in a power accumulation device, a time when the amount of the power accumulated in the power accumulation device is larger than a predetermined amount, a time when flooding is generated in the fuel cell, and a time when there is a request for stopping power generation of the fuel cell.

2. The fuel cell system according to claim 1, wherein the controller is programmed to prohibit the low-efficiency operation and to stop a power generation of the fuel cell, in a case where a request for stopping the power generation of the fuel cell is accepted.

3. The fuel cell system according to claim 1, wherein the controller is programmed to allow the start of the low-efficiency operation at the startup of the fuel cell in a case where the predetermined conditions have not been established.

4. The fuel cell system according to claim 1, further comprising:
   a supply path through which an oxidizing gas to be supplied to the fuel cell flows;
   a discharge path through which an oxidizing off gas discharged from the fuel cell flows;
   a bypass path which connects the supply path to the discharge path so that the oxidizing gas bypasses the fuel cell while flowing; and
   a bypass valve which opens and closes the bypass path,
   wherein the controller opens the bypass valve during the low-efficiency operation and closes the bypass valve during the usual operation.

* * * * *